No. 650,085. Patented May 22, 1900.
O. F. BARTEL.
CONVERTIBLE BILLIARD TABLE.
(Application filed Dec. 2, 1897.)
(No Model.) 5 Sheets—Sheet 1.
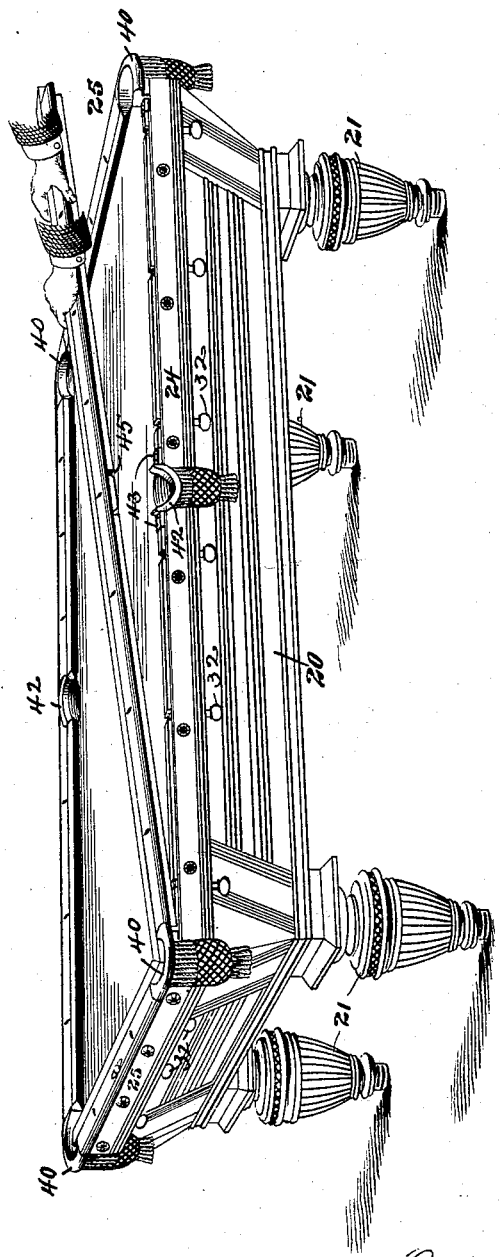
Witnesses,
Inventor,
Otto F. Bartel,
By Offield, Towle & Linthicum,
Attys.

No. 650,085. Patented May 22, 1900.
O. F. BARTEL.
CONVERTIBLE BILLIARD TABLE.
(Application filed Dec. 2, 1897.)
(No Model.) 5 Sheets—Sheet 2.
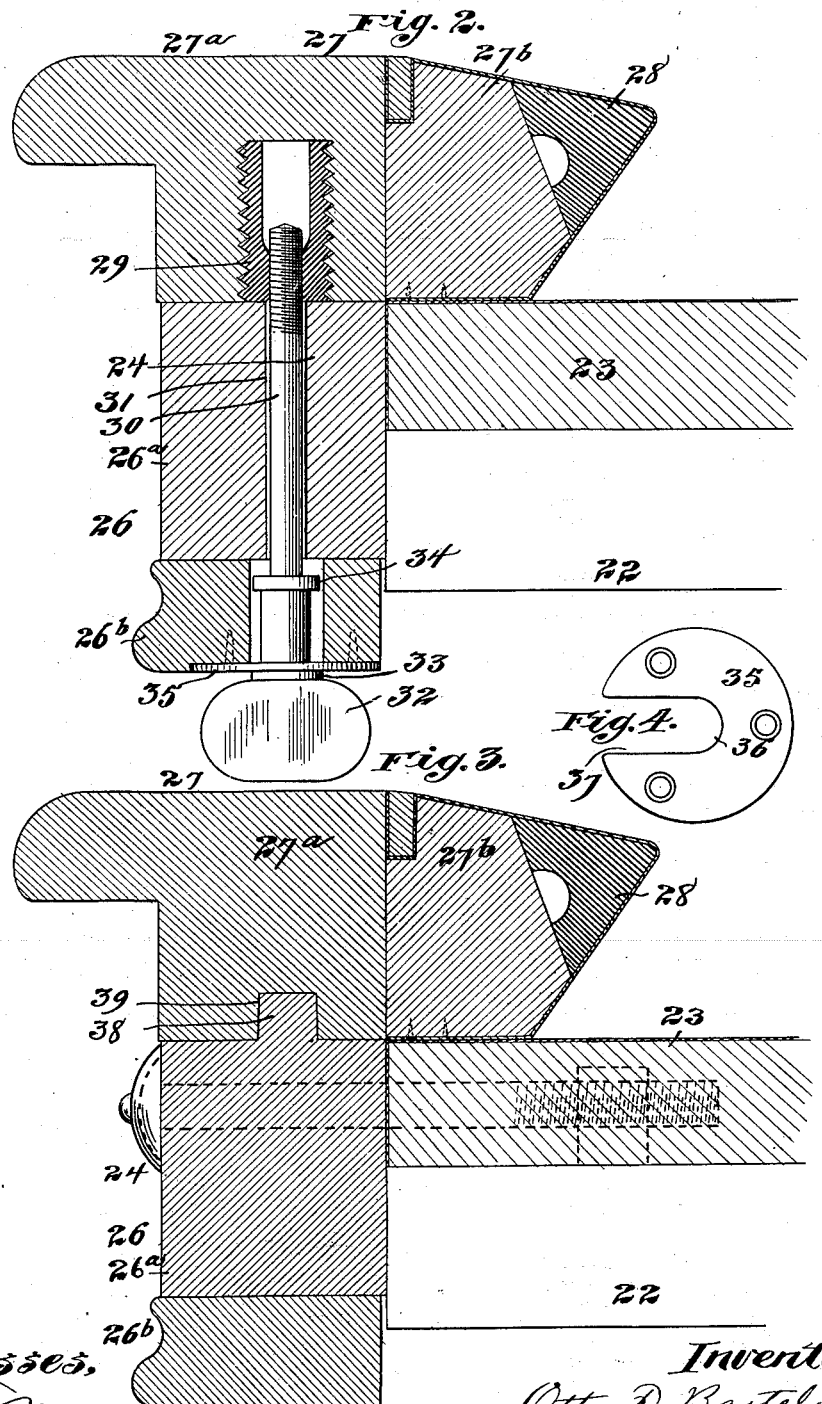
Witnesses,
Inventor,
Otto F. Bartel,
By Offield, Towle & Linthicum,
Attys.

No. 650,085. Patented May 22, 1900.
O. F. BARTEL.
CONVERTIBLE BILLIARD TABLE.
(Application filed Dec. 2, 1897.)
(No Model.) 5 Sheets—Sheet 3.
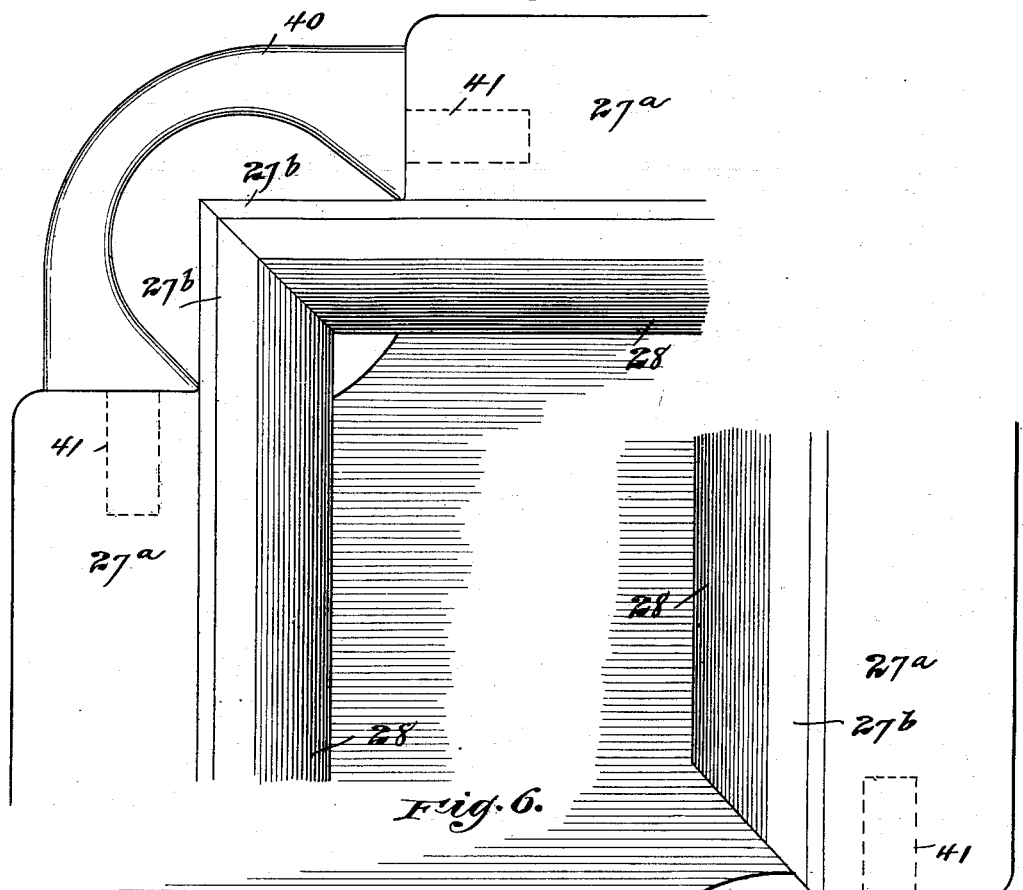
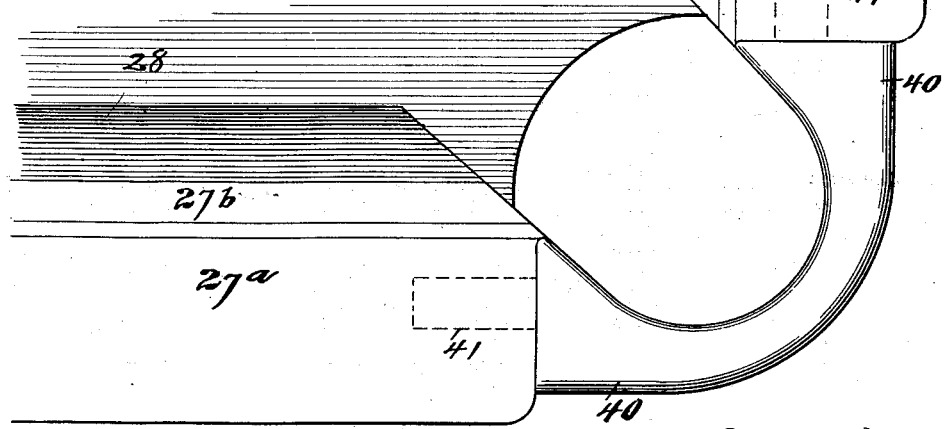

No. 650,085. Patented May 22, 1900.
O. F. BARTEL.
CONVERTIBLE BILLIARD TABLE.
(Application filed Dec. 2, 1897.)
(No Model.) 5 Sheets—Sheet 4.
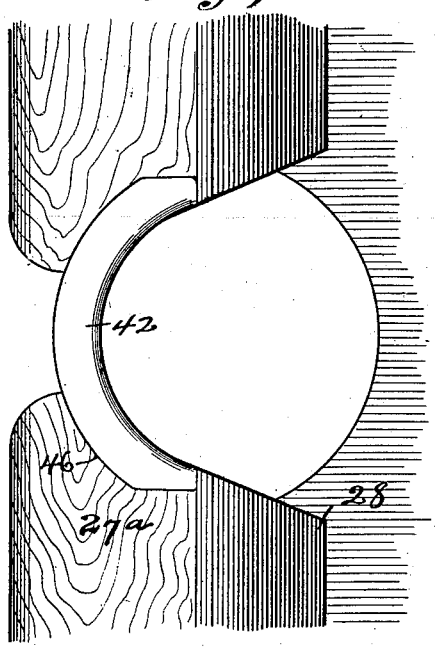
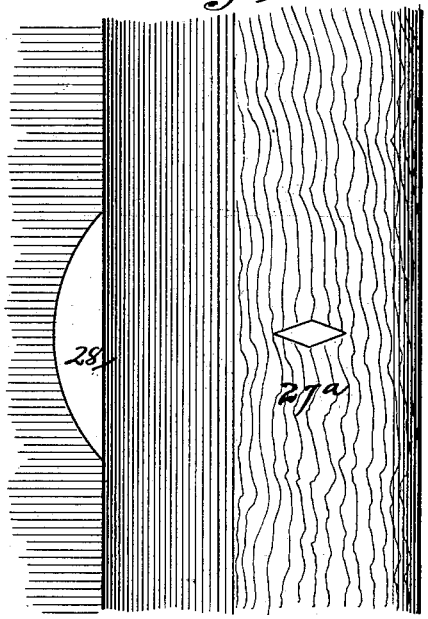
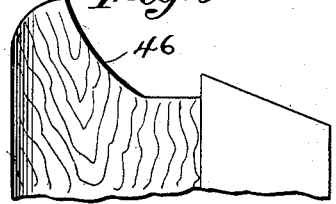
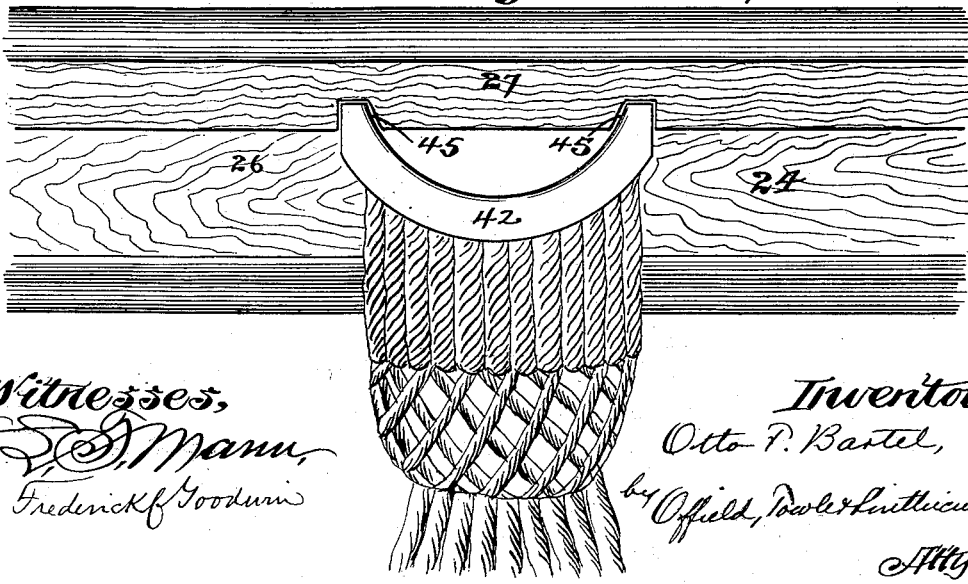
Witnesses,
Inventor,
Otto F. Bartel, No. 650,085. Patented May 22, 1900.
O. F. BARTEL.
CONVERTIBLE BILLIARD TABLE.
(Application filed Dec. 2, 1897.)
(No Model.) 5 Sheets—Sheet 5.
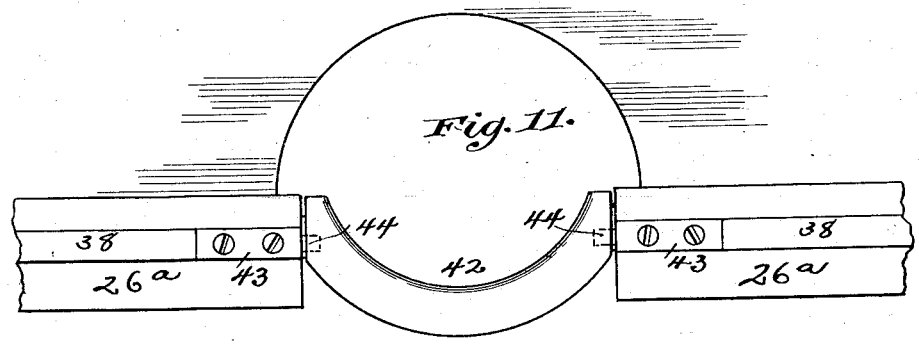
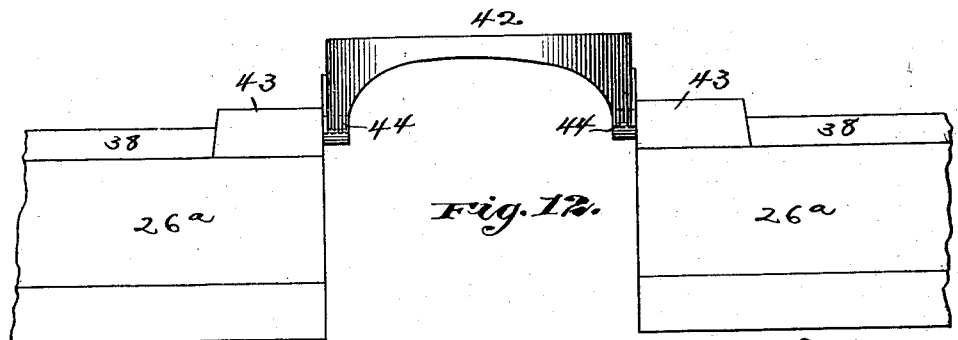
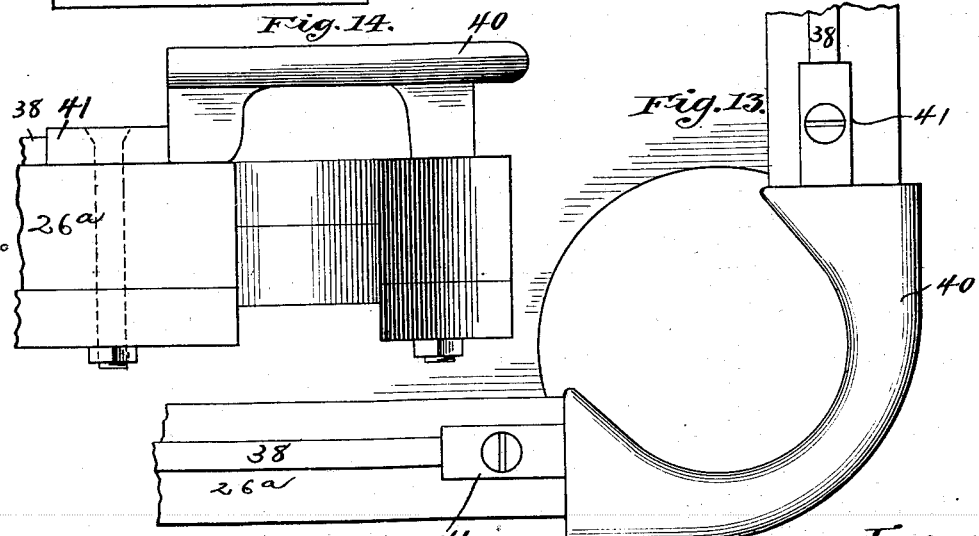
Witnesses,
Inventor;
Otto F. Bartel,
By Offield, Towle & Linthicum
Attys.
THE NORRIS PETERS CO., PHOTO-LITHO., WASHINGTON, D. C.

UNITED STATES PATENT OFFICE.

OTTO F. BARTEL, OF CHICAGO, ILLINOIS, ASSIGNOR TO THE BRUNSWICK-BALKE-COLLENDER COMPANY, OF SAME PLACE.

CONVERTIBLE BILLIARD-TABLE.

SPECIFICATION forming part of Letters Patent No. 650,085, dated May 22, 1900.

Application filed December 2, 1897. Serial No. 660,477. (No model.)

*To all whom it may concern:*

Be it known that I, OTTO F. BARTEL, of Chicago, in the county of Cook and State of Illinois, have invented certain new and useful Improvements in a Combined Billiard and Pool Table, of which the following is a specification.

My invention relates to what is commonly denominated "a combined billiard and pool table," which is, more properly speaking, a table which by either the use or disuse of certain parts, in connection with the major portions of the table or by the adjustment of certain parts always attached to the table, may be transformed from a "pocket-table" into a "carom-table," and vice versa, at the pleasure of the user of the table and without the employment of a skilled mechanic and tools to effectuate the transformation. As has been well understood almost from time immemorial, any pocket-table may be changed into a carom-table with the use of tools by a skilled mechanic or experienced "setter up" of tables and such table put back into its original condition by, first, the removal of the six originally-applied cushion-rails with their cushions and of the pockets and their "irons" and the substitution therefor of a set of four carom cushion-rails and cushions, and, second, by the removal of the latter and the reattachment to the table of the first-named set of devices; but this being a mode of transformation or change requiring either that the table be sent to a factory or that skilled workmen be sent to the table to effectuate the changes when desired it has for a great many years been sought to supply for use a table with such accompanying and either additional or interchangeable parts as could be brought into play by the user of the table without the use of tools and unpossessed of mechanical skill to transform the table for use either with or without pockets. This has for a great many years been regarded as a great desideratum both to the manufacturer of tables and to the users of the latter, since such a table, convertible to adapt it to either of the uses mentioned, can be used with profit and pleasure where there may be room to place but one table, and, besides, it can be made to answer all the purposes of a table of each kind at a small additional expense to the purchaser over the cost of one table of either kind. Many inventions have been made and patented having for their end and object the accomplishment of this desideratum, among which may be instanced a table adapted to be transformed from a pocket into a carom and back again by the addition and removal of supplemental "cushion-blocks," adapted to fill in the breaks in the continuity of the cushions of a pocket-table when attached to the latter, as shown in United States Patent No. 132,084, of 1872, and also (in an improved form) in No. 226,430, of 1880; also, a table made with "bed-rails" and separable cushion-rails, there being supplied two sets of the latter, which may be interchanged by simply manipulating with a screw-driver a set of threaded bolts, as set forth in United States Patent No. 305,463, of 1884; also, a table constructed as a pocket-table, but with flexible end portions of the rubber strips bent to form the jaws of the pockets and adapted to be unbent or straightened out and backed up by attachable blocks to change the table into one having carom or continuous cushions, as shown in United States Patent No. 386,089, of 1888; also, a table having a bed-rail provided with six permanently-arranged pockets, a set of six cushion-rails, and an interchangeable set of four cushion-rails, each set of rails being attachable to and detachable from the bed-rails by means of thumb-screws, as seen in United States Patent No. 540,405, of 1895; also, a table having two sets of cushions both connected to the table at the same time, but through the medium of mechanism or machinery for adjusting either one or the other in place around about the edge of the table-bed, as seen in United States Patent No. 588,961, of 1897. In practice, however, none of these constructions of convertible table has given good satisfaction, though the first devised—*i. e.*, that comprising the use of attachable and detachable "cushion-blocks"—has proven to be the best. Indeed, so far as my knowledge and information go, (and I have been familiar for years with the kinds of tables made and sold) this has been about the only kind of combined pool and billiard table made and used in this country. They have, however, never given great satisfaction, because of the inherent objection, especially to players possessing a moderate degree of skill at the game of carom-billiards, of a lack of integrality in or a perfect continuity of the working faces of the cushions against which the balls are played. This construction has for many years now been on the market in the improved or most approved form (shown substantially in Patent No. 226,430, of 1880) by several billiard-table manufacturers; but it has never proven acceptable to those who are tolerably-good billiard-players, mainly for the reason above mentioned. I understand that the main reason why that kind of convertible table comprising interchangeable sets of lining-strips provided with the usual rubber cushions, as seen in Patent No. 305,463, has never come into use is that it is practically (or mechanically) impossible to make a table on this plan in which the cushions will be retained in place with sufficient rigidity and will act properly and without being "noisy." The cushions of the modern, approved, and acceptable table, especially of a carom-table, must be held in place on the table-bed with the greatest possible degree of rigidity at all points, so as to get the requisite and best possible action and at the same time so as to avoid to the greatest possible extent all thumping or noise when the cushion is struck violently by the ball, and in the kind of table last-above alluded to, in which the usual soft-wood lining-strip to which the rubber cushion is glued, is secured at its outer vertical side to the vertical contacting surface of a cushion or bed rail, (by a set of horizontally-placed bolts,) that in turn is bolted (laterally bolted) to the table-bed, it is practically impossible to obtain the structural requisites of solidity and noiselessness necessary in the approved style of billiard-table. In that species of convertible table in which a series of pocket-openings are closed up to change the table from a pocket to a carom by straightening out the bent end portions of the rubber strips, according to Patent No. 386,089, it is practically impossible to attain satisfactory results, because while in this style of table the working faces or noses of the rubber cushions used for the carom game do not have their continuity broken, these portions being of a different thickness from the other (main) portions of the cushion, to permit the necessary introduction behind them of the reinforcing blocks or backings, cannot act on the balls played against them like the other parts of the cushions. I have never seen or heard of a table being manufactured or used embodying this construction. That kind of table shown in Patent No. 540,405 is practically inoperative and useless for the reason that the pockets have no "pocket-irons," without which no pocket-table is usable and which cannot be employed in the construction shown in said patent. That species of combined pool and billiard table in which the two kinds or sets of cushions with their rails are permanently connected with the table bed and body and are adjusted relatively to the table-bed to bring either one, at pleasure, into play, as in Patent No. 588,961, is too complex and expensive structurally to be of any practical use, and besides cannot be made so that either set of cushions will always be held in the operative or playing conditions with sufficient firmness or rigidity. I have devised a convertible table which, while it is exceedingly simple of construction and economic of manufacture, is as efficient for each of the playing purposes of such a table as one made in the most approved manner for either one of said purposes, and I am therefore enabled by my invention to supply for use at a comparatively-small advance over the cost of either a pocket or a carom table a table adapted to be used for either purpose and which can be easily transformed from one kind of table to the other by any one not a mechanic and without the use of any tools.

My invention consists in the novel structural features and combinations of devices which will be found hereinafter fully set forth, and which will be most particularly pointed out in the claims of this specification, and to enable those skilled in the art to make and use tables embodying my said invention I will now proceed to more fully explain the latter, referring by figures to the accompanying drawings, which form part of this specification, and in which I have shown a table made according to my invention.

In said drawings, Figure 1 is a perspective view of a table embodying my invention and illustrating the mode of conversion from one type of table to another. Fig. 2 is a vertical sectional view, on an enlarged scale, through one of the rails and cushions and its fastening devices. Fig. 3 is a similar view taken at a point intermediate of the said fastening devices. Fig. 4 is a detail bottom plan view of one of the escutcheons or guard-plates of the fastening devices. Fig. 5 is a detail plan view of one corner of the table arranged as a billiard-table. Fig. 6 is a similar view showing the parts arranged as a pool-table. Fig. 7 is a detail plan view of that portion of the table including and adjacent to one of the side pockets, showing the parts arranged as a pool-table. Fig. 8 is a detail plan view of one end of one of the short rails employed in the construction shown in Fig. 7, which end abuts against the side-pocket iron when in place. Fig. 9 is a view similar to Fig. 7, showing the parts in position to form a carom-table. Fig. 10 is a side elevation of that part of the structure shown at Fig. 9 in top view. Fig. 11 is a plan view of the side-pocket iron and its associated parts, the upper part of the rail being removed. Fig. 12 is a side elevation of the structure shown in Fig. 11. Fig. 13 is a top view of one of the corner-pocket irons and its associated parts, the upper portion of the rails being removed; and Fig. 14 is an elevation of the structure shown at Fig. 13 in top view.

In the several figures the same part will be found always designated by the same reference-symbol.

20 designates the frame of the table, supported, as usual, on legs 21 and carrying in the ordinary way the bed-framing 22, with its slabs 23, of slate, that constitute when covered over with the usual cloth the playing-surface of the table.

To the side and end edges of the bed are securely fastened, respectively, by bolts, as shown, after the fashion of attaching the ordinary cushion-rails of an ordinary billiard-table, side and end rails 24 and 25, each of which, however, has its upper surface flush with the top surface of the bed and is formed with a bottom finishing-strip $26^b$.

27 represents a set of what may be called "top rails," that are fastened down on top of the bed-rails by means of thumb-screws, as will be presently explained and which are provided with soft-wood linings $27^b$, to which are glued in a well-known manner rubber cushion-strips 28 of the approved character, the construction and combination of parts being such, it will be understood, (see particularly Figs. 2 and 3,) that when the top rails 27 shall be fastened in place the concrete cushion-rail and bed structure will be substantially identical in cross-section with that of the ordinary non-convertible table of either species—that is to say, as clearly shown at said figures, when either set of top rails 27 shall be in use they, in combination with what I have called the "bed-rails" and with the table-bed, will constitute a structure substantially identical with that of a non-convertible table, except that in the latter the two separable sets of rails I have shown are made as one set, the parts of which are either inseparable or integral.

The top rails, carrying the cushions proper, are securely fastened down on top of the bed-rails and that part of the bed's surface which their cushion-linings $27^b$ overlie by means of securing devices that can be readily manipulated by hand. The means which I prefer and have so far successfully used for this purpose, and which is best seen at Figs. 2 and 4 of the drawings, consists of a series of nuts 29, made each in the form of a bushing screwed into a hole bored in the under side of the top rail and interiorly threaded to receive the threaded upper end of one of a series of thumb-screws 30, which are arranged in the bed-rails 24 and 25. Each of these thumb-screws 30 (see Fig. 2) has its main body portion housed within a vertical bore in the main portion of the bed-rail, within which bore it fits loosely and is formed or provided with two collars 33 and 34, the latter of which fits loosely within (so that it can move up and down freely in) the enlarged bore of the supplemental portion or bottom strip $26^b$ of said bed-rail, while the other of said collars bears upwardly against a stop-plate 35, that is secured to the under side or bottom surface of said strip $26^b$. The plate 35 is formed, as seen at Fig. 4, with a cut-out of the proper size and shape to permit the assembling of the parts shown at Fig. 2, permit a free rotation of the thumb-screw, and prevent the latter from dropping down too far when out of engagement with the nut 29 by reason of the collar 34 coming down onto the said stop or bearing plate 35.

To aid in and assure the proper placement of the top rails and their cushions relatively to the bed-rails and table-bed in the use of either set of cushions, I make the bed-rails and top rails with dowel-like interlocking projections and depressions that match into each other, the preferable form of devices being that shown, (see Figs. 3 and 1,) a series of spline-like upward projections 38 of the bed-rails that engage with or fit into a series of grooves or depressions 39 in the under surfaces of the top rails. In lieu of this precise construction of the parts some other—as, for instance, a series of ordinary dowels—may be employed.

40 are the corner-pocket irons, which, it will be seen, are of a novel construction and are combined with the other parts of the table in an unusual manner. Instead of each of said irons being made as usual and having its laterally-projecting ends bolted from beneath to the topmost portion of the cushion-rail it is made, as shown, with lug-like projections 41, each located at a level considerably below that occupied by the operative ball-arresting portion of the "iron," and so that each lug enters the stock of one of the bed-rails, one being combined with an end bed-rail and the other with a side bed-rail, (see Figs. 5 and 6,) to which it is permanently bolted or otherwise secured, and said pocket-iron, as clearly seen, is of an unusual configuration, such that its upper leathered portion at each side makes a flush butt-joint with one of the top rails of the table.

The side bed-rails are of course made with cut-outs or have their continuity interrupted at the middle portions to accommodate the side pockets, just as the corner pockets have each to be accommodated between the adjacent ends of a side and an end bed-rail at each corner of the table.

The end of each side and end top rail of the carom set has its cushion-lining, or the portion $27^b$ on which the rubber strip 28 is mounted, extended sufficiently beyond that part of the top rail that makes a butt-joint with the (stationary) corner-pocket iron and is shaped so that when said carom set of top rails is placed in position for use the said cushion-linings and rubber cushions will meet with a miter-joint at each corner of the table, (the same as do the cushions of a non-convertible carom-table,) as clearly shown at Fig. 5, and it will be understood that therefore a perfect carom-table is produced by the assemblage with the main and unchangeable parts of the table made, as described, of the readily-attachable carom set of top rails.

Were the irons of the side pockets made and arranged as usual in a pocket-table the side rails of the carom set o ftop rails could not be applied, because these side-pocket irons must, to perform their function as a pocket device, be located about flush with or slightly above the level of the topmost part of the top rail. I have, however, by making each side-pocket iron 42 with two laterally-arranged socket-like depressions and attaching to the adjacent portions of the bed-rails two metallic lugs or short bars 43, with pintle-like ends 44, that respectively enter the said depressions in the pocket iron effectuated a pivotal connection of the said pocket iron with the said adjacent end portions of the two bed-rails, as best seen at Figs. 11 and 12, so that when the pocket-iron is in its normal condition or the proper position for use with the adjacent ends of two pocket-table top rails forming butt-joints with it, as shown, (see Fig. 7,) said pocket-iron will be held firmly in place. Indeed, it will, I think, be held in place to resist the concussive action of balls being holed in the pocket more securely than is held the usual form of side-pocket iron in a non-convertible pocket-table, because it is reinforced at or backed up by the abutting curved portions of the said top rail, as clearly illustrated at 46 on the drawings. When, however, these two side top rails 27ª are removed, to be replaced by one side carom-rail 27, as shown at Fig. 9, said pocket-iron is simply swerving downward (about a quarter-turn) from the normal position (seen at Figs. 7, 11, and 12) into the position shown at Fig. 10, so that only its two end portions 40 are left projecting above the level of the bed-rails of the table, and by having slight depressions or cut-outs made in the under surface of the carom-rail 27 to loosely accommodate these ends 45 the carom-rail may then be properly positioned on top of the bed-rail, as shown, and securely fastened thereto by the devices shown and described.

From what has so far been said, taken in connection with the drawings, it will be readily understood that to convert the table from a pocket to a carom it is only necessary to remove the six-pocket-table top rails after having unscrewed the thumb-screws 30, and then after turning down the pivoted irons 42 of the side pockets substitute the four carom-table top rails and fasten them in place by the use of the said thumb-screws. At Fig. 1 the table is shown as undergoing this transformation, the foremost side and the left-hand end pocket table-cushions and top rails having been taken off, an end carom top rail having been put on, the pocket-iron 42 having been turned down, and a side carom top rail being in process of placement in position by the hands of the person manipulating the change, and it will be seen that when the six top rails and cushions are applied the pocket-table as to all its operative parts is perfect and has both its cushions proper and its pocket-irons as firmly or as rigidly combined with the table-bed as are the corresponding parts of a properly-set-up ordinary pocket-table, while at the same time when the four carom top rails are substituted, as explained, a pocketless table is produced in which not only are the cushions the same as a perfect non-convertible carom-table, but in which, furthermore, the cushions proper and the rails to which they are permanently attached are as firmly or rigidly combined with the table-bed as are the cushion-rails and cushions of an ordinary carom-table of approved construction.

It will be understood, of course, that the table-bed has the necessary cut-outs of a pocket-table at its edges, and it will be seen that when the table has its interchangeable parts set or put up to form the pocketless table the latter will be exactly as efficient in all particulars as a table which has been transformed at the factory from a pocket to a carom by the substitution of one kind for another of cushion-rails such as are used in the manufacture of non-convertibe tables.

No convertible table has ever heretofore been made that I know of which has as fully or completely and satisfactorily answered the purposes of the skilful billiard and pool player as my improved table, and the reason for this is that in no prior form of convertible table have the principle of construction and mode of operation been such that when changed from a pocket to a carom, and vice versa, by the simple manipulations by hand by the user or owner of rail-securing devices capable of being manipulated without the use of tools and by one unskilled in mechanical labor the table of each species was one possessing all the rigidity of union of its parts and all the perfection of action found in the non-convertible table of each species.

Of course mere modifications may be made in the structural features shown, and many of the details may be varied from the precise forms I have shown without materially changing the novel construction peculiar to my invention, and hence without departing from the latter.

Having now so fully described my invention that those skilled in the art can readily make and use tables embodying it in either the precise form shown or under some modification thereof, what I claim as new, and desire to secure by Letters Patent, is—

1. A convertible table, comprising the following-named instrumentalities: first, a properly constructed and supported bed; second, a set of bed-rails securely fastened to said bed, substantially after the fashion of the ordinary cushion-rails of a pocket-table, but having their top surfaces, preferably, flush with the playing-surface of said bed; third, a set of pocket-irons, attached to said bed-rails and adapted to perform, efficiently, the well-known functions of the pocket-irons of an ordinary pocket-table; fourth, two sets of top rails, provided with permanently-attached cushion-strips of any approved form; one set being adapted when placed in position for use to perform the functions of pocket-table cushions, in conjunction with the said pocket-irons, and the other set being adapted to operate as carom-cushions without coaction with said irons; and, fifth, means by which, without the use of tools, or aid of skilled labor, either one of said sets of top rails may be readily attached to, or removed from, the said bed-rails.

2. In a convertible, or combined carom and pool, table, the combination, with the bed; and a set of rails secured to its edge, but extending up only to about the level of the top surface of said bed and not removable for the purpose of convertibility of the table, of a set of pocket-irons securely fastened to said rails and not removable for the purpose of convertibility; and a set of pocket-table top rails having suitable cushions and adapted when placed in union with the other above-recited elements, to coöperate therewith, to produce a perfect pocket-table; as set forth.

3. In a convertible, or combined carom and pool, table, the combination, with the bed; and a set of bed-rails secured thereto and irremovable therefrom for the purpose of convertibility, of a set of four carom-cushion top rails; and a set of pocket-irons, irremovably connected with said bed-rails; the said carom-cushion rails, when placed and secured in position rendering inoperative the said pocket-irons, and operating in conjunction with the other above-recited elements to produce a perfect pocketless billiard-table; as set forth.

4. In a convertible, or combined carom and pool table, the combination, with the bed; the set of bed-rails secured thereto, as specified; and a readily attachable and removable set of carom-cushion top rails, of side-pocket irons pivotally attached to said bed-rails and operating to turn down and underlie the said carom-cushion top rails when the latter are placed and secured in position; all substantially as hereinbefore set forth.

OTTO F. BARTEL.

Witnesses:
FREDERICK C. GOODWIN,
IRVINE MILLER.